United States Patent [19]

Chung

[11] Patent Number: 4,946,892

[45] Date of Patent: Aug. 7, 1990

[54] COMPOSITES OF IN-SITU EXFOLIATED GRAPHITE

[75] Inventor: Deborah D. L. Chung, Pittsburgh, Pa.

[73] Assignee: UCAR Carbon Technology Corporation, Danbury, Conn.

[21] Appl. No.: 105,102

[22] Filed: Oct. 5, 1987

[51] Int. Cl.[5] ............................ C08K 3/04; H01B 1/24
[52] U.S. Cl. .................................. 524/847; 264/29.1; 252/511
[58] Field of Search ....................... 524/847; 264/29.1; 252/511

[56] References Cited

U.S. PATENT DOCUMENTS

| | | |
|---|---|---|
| 1,137,373 | 4/1915 | Alysworth . |
| 1,191,383 | 7/1916 | Alysworth . |
| 3,404,061 | 10/1968 | Shane et al. . |
| 3,492,197 | 1/1970 | Olstowski et al. . |
| 4,414,142 | 11/1983 | Vogel et al. . |
| 4,530,949 | 7/1985 | Atkinson et al. ............ 523/512 |
| 4,704,231 | 11/1987 | Chung ........................ 252/511 |
| 4,798,771 | 1/1989 | Vogel ............................ 252/29 |
| 4,799,956 | 1/1989 | Vogel ........................... 252/502 |
| 4,799,957 | 1/1989 | Vogel ........................... 252/502 |

FOREIGN PATENT DOCUMENTS 179650  10/1984  Japan ................................ 252/511

OTHER PUBLICATIONS

Ian W. Wong and D. D. L. Chung, "Oriented Exfoliated Graphite-Polymer Composites Made by In Site Exfoliation", 18th International SAMPE Technical Conference, Oct. 7-9, 1986.

*Primary Examiner*—John C. Bleutge
*Assistant Examiner*—David W. Woodward
*Attorney, Agent, or Firm*—Eugene Lieberstein

[57] ABSTRACT

Composites of graphite dispersed in a solid matrix of a polymeric resin, wherein intercalated graphite flakes are mixed with a liquid polymeric resin and exfoliated in-situ in the liquid resin during the curing of the resin before complete solidifcation of the resin.

7 Claims, 1 Drawing Sheet

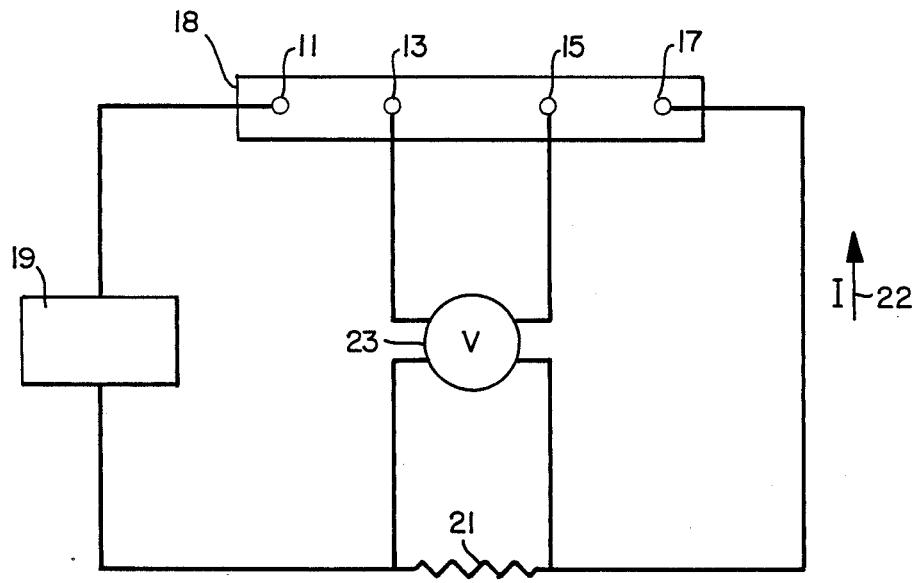

COMPOSITES OF IN-SITU EXFOLIATED GRAPHITE

FIELD OF THE INVENTION

This invention relates to composites of expanded exfoliated graphite flakes in a polymeric matrix.

BACKGROUND OF THE INVENTION

Graphite is a form of carbon with the carbon atoms bonded in layers with weaker bonds between the layers. This structure allows intercalation by additional atoms or molecules which occupy spaces between the carbon layers. Graphite can be intercalated by exposure to an appropriate chemical reagent, known as the intercalate, which allows the intercalate to enter between the carbon layers of the graphite. Intercalation can be performed, for example, by immersing graphite flakes in red fuming nitric acid for a day or more. The resulting material, known as intercalated graphite or a graphite intercalation compound, comprises carbon layers and intercalate layers stacked on top of one another in a periodic fashion. For example, the stacking can be of the form —C—C—I—C—C—I—C—C—I—C—, where C is a carbon layer, and I is an intercalate layer. The number of carbon layers between the nearest intercalate layers is known as the stage. For example, —C—C—I—C—C—I—C—C—I—C—C—I— represents a stage 2 intercalated graphite.

Heating intercalated graphite flakes to a sufficiently high temperature causes exfoliation, which is a sudden increase in the dimension perpendicular to the carbon layers of the intercalated graphite, forming vermicular or wormlike shapes. The exfoliated graphite flakes, or worms, are expanded up to hundreds of times along the c-axis of the graphite, which is the axis perpendicular to the carbon layers.

Forming exfoliated graphite from graphite flakes is described in U.S. Pat. Nos. 1,191,383, and 3,404,061, and from pyrolytic graphite in U.S. Pat. No. 3,404,061. Generally these patents describe formation of exfoliated graphite flakes by first intercalating graphite flakes with an intercalating agent, such as nitric acid, and subsequently heating the intercalated flakes to an elevated temperature, typically to about 600° C. or higher.

Composites comprising compressed exfoliated graphite and a polymeric resin have been made. For example, Alysworth in U.S. Pat. Nos. 1,137,373 and 1,191,383 discloses composites made by treating exfoliated graphite with a phenol-formaldehyde binder and compressing the binder-treated graphite into an integral mass.

Shane et al. in U.S. Pat. No. 3,404,061 disclose a process wherein vermiform graphite is compressed without a binder to form a soft, flexible sheet material. Impregnants or additives, such as metal powders, clays, or organic polymer materials may be added.

Olstowski et al. in U.S. Pat. No. 3,492,197 disclose the production of composites of compressed vermicular or exfoliated graphite and a polymeric resin. The composites are produced by compressing mixtures of exfoliated graphite and a polymeric resin at a pressure between 5 and 50,000 psi (34 kPa–340 MPa), sufficient to compress the graphite in the composite.

Vogel et al. in U.S. Pat. No. 4,414,142 disclose a highly conductive composite comprising an organic polymer matrix with an unexfoliated graphite intercalation compound. The composite may be formed by molding together a mixture of intercalated graphite, and a polymeric resin at a molding temperature below about 160° C., which is low enough so as not to affect or destroy the intercalated graphite, or i.e., to cause the transformation of the intercalated graphite into an exfoliated state.

In forming composites of exfoliated graphite and a polymer by prior art methods, the graphite must be intercalated and then exfoliated, after which the exfoliated graphite is mixed with a liquid resin which is then solidified to form a composite of graphite and the resin. It would be desirable to form composites of exfoliated graphite without the necessity of a previous exfoliation step.

OBJECTS OF THE INVENTION

An object of the invention is to provide a method for forming a composite of graphite in an expanded, exfoliated state in a polymeric matrix by expanding the graphite in-situ in a liquid polymeric resin.

Other objects of the invention will be apparent in the description below.

SUMMARY OF THE INVENTION

An embodiment of the invention is a method for forming a composite of exfoliated graphite dispersed in a polymeric resin matrix which comprises;
(a) forming a suspension comprising intercalated unexfoliated graphite flakes in a liquid polymeric thermoset resin matrix, wherein the liquid resin cures at a temperature above the graphite exfoliation onset temperature,
(b) heating to a temperature above the graphite exfoliation onset temperature to exfoliate the graphite flakes and initiate solidification by curing of liquid thermoset resin, and maintaining a temperature to fully solidify the thermoset resin to form a solid composite comprising graphite flakes with an expanded exfoliated structure dispersed in a solid polymer matrix.

By "intercalated unexfoliated graphite" is meant graphite treated with an intercalation component, which has not been exposed to a high temperature to expand the graphite into an exfoliated graphite. Methods for intercalating graphite are disclosed in U.S. Pat. No. 3,404,061 to Shane et al., which is hereby incorporated by reference.

By "exfoliation onset temperature" is meant the lowest temperature at which the intercalated graphite begins to exfoliate. The exfoliation onset temperature can be determined by measuring the temperature at which the graphite begins to expand or exfoliate.

A intercalated graphite is chosen with an exfoliation onset temperature below a temperature at which the liquid resin cures to become a solid. It is understood by those in the art that the rate of curing is dependent upon temperature, and a temperature can be chosen in which the resin cures sufficiently slowly to allow the graphite to exfoliate and expand while the resin is liquid. Typically the exfoliated graphite will expand in less than about one minute. Preferably the temperature for exfoliating the graphite is chosen such that the resin is still liquid after one minute.

An advantage of the method of the invention for forming composites, over prior methods is a reduction in process steps. The known methods require (1) intercalation of the graphite, (2) exfoliation of the intercalated graphite, (3) mixing the exfoliated graphite with a resin, and (4) solidification of the resin. In contrast, the method of the invention requires (1) intercalation of the graphite, (2) mixing of the intercalated graphite with a thermosetting resin, and (3) insitu exfoliation of the graphite and curing of the resin. The method of the invention thus requires one less step, avoiding a separate exfoliation step.

BRIEF DESCRIPTION OF THE DRAWING

The sole FIGURE illustrates the four-probe method used in the examples below.

DESCRIPTION OF THE INVENTION

In the method of the invention the suspension of intercalated unexfoliated graphite flakes in the liquid polymeric thermosetting resin is formed with sufficient polymeric resin to completely surround the intercalated graphite flakes and form a continuous phase of the liquid resin. Preferably the intercalated graphite is substantially uniformly distributed in the liquid resin.

The proportion of intercalated graphite and polymer in the suspension can vary over a wide range, as long as there is sufficient resin to form a continuous phase. Increasing the proportion of intercalated graphite to the resin in the suspension decreases the density, the tensile strength, and the resistivity of the composite.

The liquid polymeric resin may be any suitable thermoset resin which as a liquid can be mixed with the intercalated graphite, and cured by heating the mixture to or above the exfoliation onset temperature. A suitable thermoset resin is the polyimide used in the examples below.

A suitable intercalated graphite is one which has an exfoliation onset temperature at a temperature at which the thermosetting resin will remain liquid for a sufficient time to allow exfoliation of the graphite. The particular intercalated graphite chosen would depend upon the curing properties of the thermosetting resin used. Generally, intercalated graphite with an exfoliation on-set temperature in the range of 200° C. to 300° C. is suitable. Suitable intercalated graphites are natural graphite flakes intercalated with bromine, aluminum chloride, or nitric acid.

Any hardeners, activating agents, cross-linking agents, and the like, for the curing of the polymeric resin are added to the resin before the graphite is mixed with the resin. The mixing conditions and the thermoset resin system are chosen such that the polymeric resin remains liquid while the mixture is being formed.

The suspension is heated to a temperature above the exfoliation onset temperature to exfoliate the graphite flakes and to initiate curing of the resin. During the heating the exfoliation of the intercalated graphite is much quicker than the solidification or curing of the liquid resin, so the graphite flakes exfoliate while the resin is sufficiently liquid to permit expansion of the flakes. After exfoliation of the graphite, the suspension is maintained at an elevated temperature to fully solidify the resin, thereby irreversibly retaining the flakes in an expanded exfoliated state.

By way of illustration of the invention, if bromine is used as the intercalating agent to form the intercalated graphite, the exfoliation onset temperature is about 180° C. Preferably the suspension is heated somewhat above the exfoliation onset temperature, to about 200° C. or above. For other forms of intercalated graphite, it is within the ability of one of ordinary skill to choose an appropriate temperature to exfoliated the graphite and solidify the resin. Generally, the temperature to which the intercalated graphite/liquid resin mixture is heated is below 300° C., since typical thermosetting resins will not cure satisfactorily at a higher temperature.

Another aspect of the invention is a composite made by the method of the invention which comprises a composite of expanded exfoliated graphite in a solid matrix of a polymeric resin, wherein the exfoliated graphite was expanded or exfoliated in-situ while the polymeric resin was liquid and before the resin became solid.

A useful property of the composites made by the invention, is that the resistivity of the composite can be varied over a wide range to suit a particular application. Polymeric resins alone are typically electrical insulators. For example, the electrical resistivity of pure polyester is about $10^{13}$ ohm-cm. By increasing the volume fraction of exfoliated graphite flakes in the composite, the electrical resistivity of the composite is lowered.

The graphite layers in the composites of the invention reflect electromagnetic radiation. The composite of the invention may thus be used as a low-density electromagnetic interference (EMI) shield, a low-density electrical conductor, a gasket, etc. The composites are also useful for making electrical and thermal conductors.

The electrical, and electromagnetic properties of the composites are coupled with a low density, due to the content of exfoliated graphite which has an expanded structure. Thus, it is possible to provide desired electrical properties with a considerable weight savings as compared to previous materials. In addition, since the composites made by the method of the invention can be formed in conventional molding equipment, the composite of the invention can be made into many low-density shapes.

The higher the volume fraction of exfoliated graphite, the lower the density of the composite. In contrast, the density of composites of graphite without the expanded exfoliated structure (including pristine graphite intercalated unexfoliated graphite, and highly compressed exfoliated graphite) usually increases with increasing volume fraction of graphite because of the relatively high density of the unexfoliated graphite. Therefore, the density of the composites of this invention is significantly lower than the densities of composites comprising unexfoliated graphite.

The composite may optionally be heated to carbonize the polymeric thermoset resin. The result is a carbon-carbon composite with a resistivity much lower than that of the original composite. For example, a reduction of resistivity as high as a factor of six can be expected.

EXAMPLES

The following examples are intended to illustrate the method of the invention, and are not intended to limit the scope of the present invention in any manner.

In the examples, the thermoset resin was a polyimide polymer obtained from Monsanto Corporation under the name "Skybond 700 ™", and was a heat reactive aromatic resin that could be thermally cured to a cross-linked polyimide. The density of the cured polyimide was 1.32 g/cm$^3$.

The density of the composite was measured by weighing the sample and calculating the volume of the sample by taking the dimensions with a micrometer.

The tensile strength and ductility were measured parallel to the composite plate (perpendicular to the direction of compression) using a Instron Model 1125 (22,000 lb. - load frame) mechanical testing system. The strain for the tensile strength was measured by using an extensometer with knife edges separated by 2.5 cm. The cross sections of the tensile specimens were typically about 1.0 cm×0.5 cm over the length of the gage.

The compressive modulus was measured with an Instron Model 1125 mechanical testing system according to standard procedures. The compression was carried on the plane parallel to the composite plate as well as the plane perpendicular to the composite plate.

The flexural strength and flexural modulus were measured by the three point bending test in accordance with ASTM standard D 790-81 on an Instron Model 1125 mechanical testing system.

Measurement of the electrical resistivity was made in directions parallel to and perpendicular to the plane of the composite plate by using the four-probe method. A schematic of the four probe method is shown in the FIGURE. Four electrical contacts 11, 13, 15, and 17 were made along the length of the test sample 18 by using silver paint. A variable DC power supply 19 (24 V, 12 A maximum) was connected to the current probes 11, 17, such that it was in series with a standard resistor 21. The current (represented by arrow 22 was determined by measuring the voltage with voltmeter 23 across the standard resistor 21. The resistivity was calculated from the voltage across contacts 13, and 15, and the current value.

The X-ray diffraction data was produced by conventional techniques by measuring the relative integrated intensities of the graphite at the 002 and 100 line, observed by using Cu K$^\alpha$ radiation and a $\theta$-$2\theta$ x-ray diffractometer. Measurements were made parallel to and perpendicular to the plane of the composite plate.

EXAMPLE 1

A composite of the invention was made using graphite and a thermoset resin using the method of the invention.

The graphite used was natural crystalline graphite with flakes of a size of about 0.4 mm. The flakes were intercalated with bromine by exposure of the graphite flakes to bromine vapor in air at room temperature for 3 days, resulting a stage-2 intercalation compound. Then the intercalated graphite was removed from the bromine reservoir and allowed to desorb in air at about 110° C. for about 1 day, to from a compound containing about 20 weight percent bromine or 1.5 mole percent Br$_2$. The density of the intercalated graphite was about 2.9 g/cm$^3$.

The composites were produced in the form of plates by preparing a mixture of the graphite-bromine intercalation compound (60 g) and the thermosetting resin (40 g), wrapping the mixture in several layers of aluminum foil, and compressing the wrapped mixture between two plates at a pressure of 80 kPa in air at about 200° C. for about 45 minutes. The expansion during exfoliation caused the wrapping to develop cracks. Subsequent cooling was allowed to occur while the composite was under pressure. The pressure (80 kPa) was maintained during both heating and cooling. The composites formed after curing were in the form of plates about 0.6 cm thick with the plane of the plate perpendicular to the vector of the applied force.

The expanded exfoliated structure of intercalated flakes in the composite was confirmed by scanning electron microscopy (SEM) of the fracture surface obtained after tensile strength testing. The SEM micrograph revealed the honeycomb structure which is typical of exfoliated graphite. SEM also revealed that the majority of the volume of the composite was occupied by the exfoliated graphite.

EXAMPLE 2

Composites were prepared as in Example 1 except mixtures of intercalated graphite and the thermosetting resin were compressed to a pressure between 40 and 80 kPa at a temperature of 200° C., for 20 minutes. The properties of a representative composite is shown below in Table I;

TABLE I

| In-Situ Composite Properties | |
| --- | --- |
| Composite Density (cm$^3$/g) | 0.74 |
| Composite Volume (cm$^3$) | 85.93 |
| Composite Weight (g) | 63.8 |
| Electrical Resistivity (ohm-cm) | |
| Parallel | 1.4 |
| Perpendicular | 2.4 |
| Tensile Strength (MPa) | 0.88 |
| Ductility (%) | 0.21 |
| Flexural Strength (MPa) | 2.9 |
| Flexural Modulus (MPa) | 850 |
| Compressive Modulus (MPa) | |
| Parallel | 55 |
| Perpendicular | 136 |
| I100/I002 | |
| Parallel | 9.2 × 10$^{-4}$ |
| Perpendicular | 2.2 × 10$^{-2}$ |
| I110/I002 | |
| Parallel | 2.6 × 10$^{-3}$ |
| Perpendicular | 2.8 × 10$^{-2}$ |

EXAMPLE 3

The carbonization of the polyimide in the composite as in Example 1 or 2 is accomplished by heating in a vacuum induction furnace at 10$^{-4}$ torr and 1200° C. for 20 minutes. The resultant carbon-carbon composite will exhibit an even lower electrical resistivity than the composite before carbonization.

While this invention has been described with reference to certain specific embodiments and examples, it will be recognized by those skilled in the art that many variations are possible without departing from the scope and spirit of the invention, and that the invention, as described by the claims, is intended to cover all changes and modifications of the invention which do not depart from the spirit of the invention.

What is claimed is:

1. A method for forming a composite of exfoliated graphite dispersed in a polymeric resin matrix which comprises;
   (a) forming a suspension comprising intercalated unexfoliated graphite flakes in a liquid polymeric thermoset resin matrix, wherein the liquid resin cures at a temperature above the graphite exfoliation onset temperature,
   (b) heating to a temperature above the graphite exfoliation onset temperature to exfoliate the graphite flakes and initiate solidification by curing of liquid thermoset resin, and maintaining a temperature to fully solidify the thermoset resin to form a solid composite comprising graphite flakes with an expanded exfoliated structure dispersed in a solid polymer matrix.

2. The method of claim 1 wherein the intercalated graphite is graphite-bromine and the temperature to exfoliate the graphite is greater than 180° C.

3. The method of claim 2 wherein the temperature to exfoliate the graphite is 200° C.

4. The method of claim 1 wherein the polymer is a polyimide.

5. The method of claim 1 wherein the composite is heated sufficiently to carbonize the solid polymeric resin.

6. A composite comprising expanded exfoliated graphite flakes in a solid matrix of a polymeric resin formed of an anisotropic structure having a crystallographic preferred orientation, wherein the graphite flakes have an expanded exfoliated structure resulting from the in-situ exfoliation of the graphite while the polymeric resin is liquid during the curing of the resin.

7. The composite of claim 6 wherein the polymeric resin is a polyimide.

* * * * *

UNITED STATES PATENT AND TRADEMARK OFFICE
CERTIFICATE OF CORRECTION

PATENT NO. : 4,946,892

DATED : August 7, 1990

INVENTOR(S) : Deborah D.L. Chung

It is certified that error appears in the above-identified patent and that said Letters Patent is hereby corrected as shown below:

Column 4, line 61, delete "1.32" and substitute therefor --1.39--.

Column 5, line 52, delete "(60g)" and "(40".

Column 5, line 53, delete "g)".

Column 6, line 7, after "graphite" insert --(60g)--.

Column 6, line 8, after "resin" insert --(40g)--.

Column 6, line 9, after "minutes" insert --, and that a steel mold with a steel piston was used in place of aluminum foils-- .

Signed and Sealed this

Seventeenth Day of March, 1992

Attest:

HARRY F. MANBECK, JR.

Attesting Officer

Commissioner of Patents and Trademarks